United States Patent
Graichen

(10) Patent No.: US 8,009,041 B2
(45) Date of Patent: Aug. 30, 2011

(54) ACCESS MONITORING AND CONTROL SYSTEM AND METHOD

(75) Inventor: Catherine Mary Graichen, Malta, NY (US)

(73) Assignee: UTC Fire & Security Americas Corporation, Inc., Bradenton, FL (US)

( * ) Notice: Subject to any disclaimer, the term of this patent is extended or adjusted under 35 U.S.C. 154(b) by 822 days.

(21) Appl. No.: 11/938,820

(22) Filed: Nov. 13, 2007

(65) Prior Publication Data

US 2009/0121869 A1    May 14, 2009

(51) Int. Cl.
*G08B 13/00* (2006.01)

(52) U.S. Cl. ........... 340/541; 340/547; 340/545.2; 340/573.1; 340/506; 340/517; 340/520; 340/523; 340/526; 340/426.1; 726/22

(58) Field of Classification Search .......... 340/541, 340/547, 545.2, 573.1, 506, 517, 520, 523, 340/526, 426.1; 726/22
See application file for complete search history.

(56) References Cited

U.S. PATENT DOCUMENTS

| | | | |
|---|---|---|---|
| 3,947,838 A | | 3/1976 | La Forge, Jr. |
| 5,319,362 A | * | 6/1994 | Hyatt, Jr. .................... 340/5.33 |
| 5,638,046 A | * | 6/1997 | Malinowski ............ 340/539.17 |
| 6,720,874 B2 | * | 4/2004 | Fufido et al. .................. 340/541 |
| 7,091,865 B2 | | 8/2006 | Cuddihy et al. |
| 7,113,090 B1 | * | 9/2006 | Saylor et al. ............ 340/539.18 |
| 2002/0067259 A1 | | 6/2002 | Fufido et al. |
| 2005/0002530 A1 | | 1/2005 | Kogan et al. |

* cited by examiner

*Primary Examiner* — Tai T Nguyen
(74) *Attorney, Agent, or Firm* — Kinney & Lange, P.A.

(57) ABSTRACT

An access monitoring and control system is provided. The access monitoring and control system includes a sensing device configured to collect data points regarding at least one of movement of a person through an access portal and a state of the access portal and a processing unit configured to receive the data points from the sensing device and to form activity clusters from the data points based upon similar patterns of inactive or active behaviors.

19 Claims, 4 Drawing Sheets

ACCESS MONITORING AND CONTROL SYSTEM AND METHOD

BACKGROUND

The invention generally relates to security systems and, more particularly, to access monitoring and control systems for such security systems.

Access monitoring and control systems form a key component of security systems employed for a variety of private and public sites. Typically, access monitoring and control systems employ physical devices such as sensors, biometric scanners and keypad entry devices to track activity of individuals and/or objects through entrances to sites. It is desirable to monitor activities using such access monitoring and control systems and to identify any unusual patterns of inactivity. Typically, if an access control system indicates a lack of activity from a particular entrance to a site, it is difficult to find if the physical device located at such entrance is damaged or if there is some abnormal behavior at that entrance.

Certain systems look at historical time periods to determine the reasons for indication of lack of activity. However, through such conventional systems this requires obtaining several weeks of historical activity data and creating a behavioral model based upon such data. Further, certain systems examine such historical activity data on a daily basis to reduce training time for the behavioral model. Unfortunately, such techniques require large amounts of training data and also require high processing time for comparing any new activity with the training data.

It is therefore desirable to provide a real-time, efficient, reliable, and cost-effective technique for obtaining activity data for access monitoring and control systems. It is also desirable to provide techniques to analyze such activity data to detect any abnormal behavior or any potential problems with the system.

BRIEF DESCRIPTION

Briefly, in accordance with one aspect of the present technique an access monitoring and control system is provided. The access monitoring and control system includes a sensing device configured to collect data points regarding at least one of movement of a person through an access portal and a state of the access portal and a processing unit configured to receive the data points from the sensing device and to form activity clusters from the data points based upon similar patterns of inactive or active behaviors.

In accordance with another aspect of the present technique, a method of providing an access monitoring and control system is provided. The method includes providing a sensing device for collecting data points regarding at least one of movement of a person through an access portal and a state of the access portal and providing a processing unit to receive the data points from the sensing device and to form activity clusters from the data points based upon similar patterns of inactive or active behaviors. Systems that afford such functionality may be provided by the present technique.

In accordance with a further aspect of the present technique, a method of detecting an abnormal activity for an access control system is provided. The method provides for obtaining activity data from the access control system, grouping the obtained activity data into activity clusters based upon similar patterns of inactive or active behaviors and evaluating new data points against the activity clusters to detect the abnormal activity. Here again, systems affording such functionality may be provided by the present technique.

These and other advantages and features will be more readily understood from the following detailed description of preferred embodiments of the invention that is provided in connection with the accompanying drawings.

DRAWINGS

DETAILED DESCRIPTION

Embodiments of the invention are directed to an access monitoring and control system and a method for the same. As used herein, the term "access monitoring and control system" refers to a system to monitor and control activity through an access portal such as a door or a window having an electronic means to enter or exit.

Figure 1:
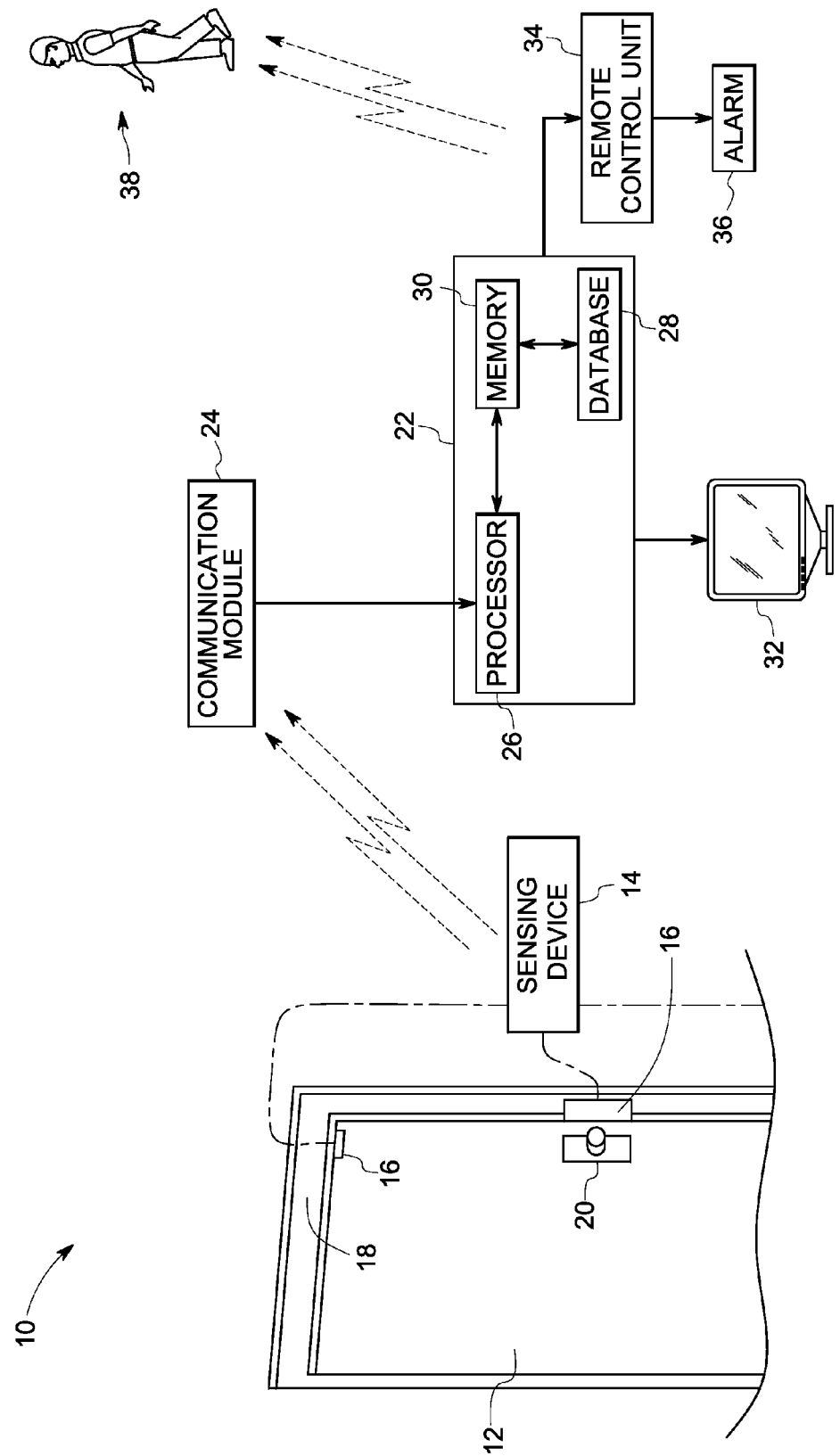
FIG. 1 is a schematic diagram of an access monitoring and control system in accordance with an embodiment of the invention.

Referring now to FIG. 1, a schematic diagram of an access monitoring and control system 10 for an access portal 12 is illustrated. Examples of the access portal include a door and a window. The access monitoring and control system 10 includes a sensing device 14 configured to collect data points regarding at least one of movement of a person or an object through the access portal 12 and a state of the access portal 12. In this exemplary embodiment, the state of the access portal 12 includes an open or a closed state of the access portal 12.

In certain embodiments, the sensing device 14 receives the data points regarding the movement of the person and the state of the access portal through a plurality of sensors 16 disposed at different locations. For example, such sensors 16 may be located on the door 12, or on a door frame 18, or on a door latch 20, or combinations thereof. Examples of the sensors 16 include a motion sensor, a key pad entry, a card reader and a biometric reader. In certain embodiments, the sensors 16 include wireless sensors capable of wirelessly communicating signals to a remote unit.

The access monitoring and control system 10 includes a processing unit 22 configured to receive the data points from the sensing device 14 and to form activity clusters from the data points based upon similar patterns of inactive or active behaviors. The access monitoring and control system 10 also includes one or more communication modules 24 to transmit the data points to the processing unit 22. The communication modules 24 include wired or wireless networks, which communicatively link the sensing device 14 to the processing unit 22. For example, the communication modules 24 may operate via telephone lines, cable lines, Ethernet lines, optical lines, satellite communications, radio frequency (RF) communications, and so forth.

The processing unit 22 includes a processor 32 configured to analyze the data points from the sensing device 14 to form the activity clusters. The processing unit 22 also includes one or more databases 28 and memory 30. The memory 30 may include hard disk drives, optical drives, tape drives, random access memory (RAM), read-only memory (ROM), programmable read-only memory (PROM), Redundant Arrays of Independent Disks (RAID), flash memory, magneto-optical memory, holographic memory, bubble memory, magnetic drum, memory stick, Mylar® tape, smartdisk, thin film memory, zip drive, and so forth. The database 28 may utilize the memory 30 to store the data points and the formed activity clusters, and other data or code to form the activity clusters based upon similar patterns of inactive or active behaviors.

In operation, the processor 26 analyzes the data points regarding movement of persons and/or objects through the door 12 and an open or closed state of the door 12 from the sensing device 14. Further, the processor 26 forms the activity clusters based upon similar patterns of inactive or active behaviors of activities at the door 12. In certain embodiments, the activity clusters are formed using data points corresponding to similar patterns of behaviors during days of a week. In certain other embodiments, the activity clusters are formed using data points corresponding to similar patterns of behaviors during weekdays or weekends.

In particular, the data points from the sensing device 14 are organized in timeslots indicating number of quiet minutes at the start of each time slot. For example, each hour of a day may represent a time slot. Further, at a particular hour, at 1:00 am for example, the number of minutes from the last activity at the door until 1:00 am is estimated. If the last activity at the door 12 was detected at 12:28 AM, then the number of quiet minutes would be 32 minutes. Once the data points are organized as described above, a clustering algorithm may be employed by the processor to group the data points into clusters based upon similar patterns of behaviors. In this exemplary embodiment, each day represents an instance in the data set and each timeslot represents one attribute of such instance. The clustering algorithm groups the data points that have the most similar patterns of inactive behavior to form the activity clusters.

In the illustrated embodiment, the processor 26 is configured to evaluate new data points against the formed activity clusters to detect an abnormal behavior for the new data points. The access monitoring and control system 10 includes a display 32 configured to display an indication of the abnormal behavior of the new data points. Additionally, the processing unit 22 is configured to transmit a signal indicative of the abnormal behavior of the new data points to a remote control unit 34. Further, the remote control unit 34 is configured to trigger an alarm indicative of the abnormal behavior. In certain embodiments, the abnormal behavior of the data points is representative of an improper functioning of the sensing device 14. In certain embodiments, the remote control unit 34 transmits information regarding the abnormal behavior to security personnel 38 for taking corrective actions in response to the abnormal behavior detected at the door 12.

Figure 2:
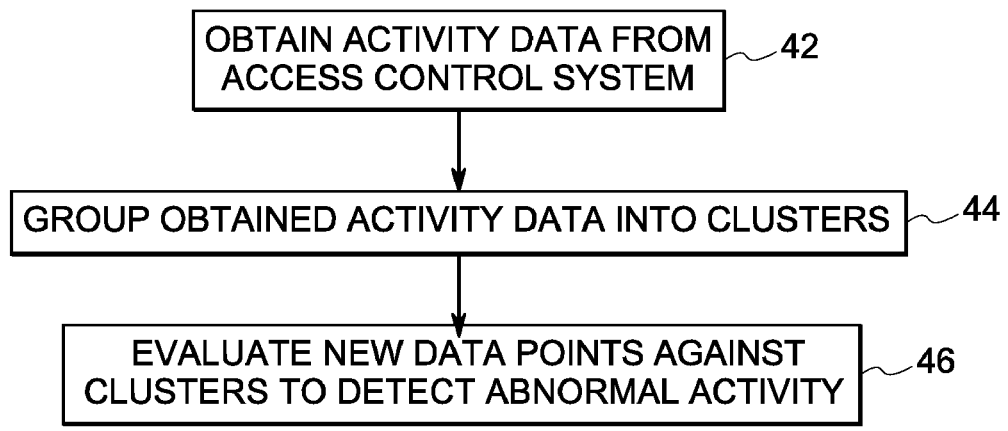
FIG. 2 is a flow chart representing steps in an exemplary method for providing an access monitoring and control system in accordance with an embodiment of the invention.

FIG. 2 is a flow chart representing steps in an exemplary method for providing an access monitoring and control system in accordance with an embodiment of the invention. The method includes obtaining activity data from an access control system in step 42. The activity data includes data regarding movement of persons or objects through an access portal and a state of the access portal. As described above, a plurality of sensors located at various locations are employed to obtain the activity data. Further, the obtained data is grouped into activity clusters in step 44. In particular, the data is organized in time slots and a clustering algorithm is employed to form the activity clusters where each day represents an instance in the data set and each timeslot represents an attribute of the instance. The clustering algorithm groups the days that have the most similar patterns of inactive behavior.

In certain other embodiments, the activity clusters are formed using data points corresponding to similar patterns of behaviors during weekdays or weekends. It should be noted that to separate weekdays from weekend's behaviors it is desirable to have at least three weeks of data. Further, in certain embodiments, more data is required if behaviors only appear during some weeks and not every week.

Once the clustering algorithm reports the activity clusters, the day instances in the clusters are examined. For example, if the clustering algorithm uses relatively less amount of data, then heuristic approaches may be employed to evaluate the activity clusters. In one exemplary embodiment, the heuristic approach includes examining a percentage of the instances for each day of the week that appear in only one cluster. If this percentage of the instances is relatively high then day of the week may be considered as a differentiator and the training set may be divided accordingly.

In certain embodiments, the clustering algorithm may form a large number of activity clusters or day of the week patterns may not be obvious using the obtained data. In such scenarios, the process described above may be reapplied to more data and the model may be updated in an adaptive manner. Once the activity clusters are formed, new data points are evaluated against the formed activity clusters to detect an abnormal activity in step 46. In certain embodiments, a maximum inactivity line and an alert line may be generated based upon the obtained activity data. Further, it is determined if the new data points exceed the maximum inactivity line or the alert line to detect the abnormal activity.

Figure 3:
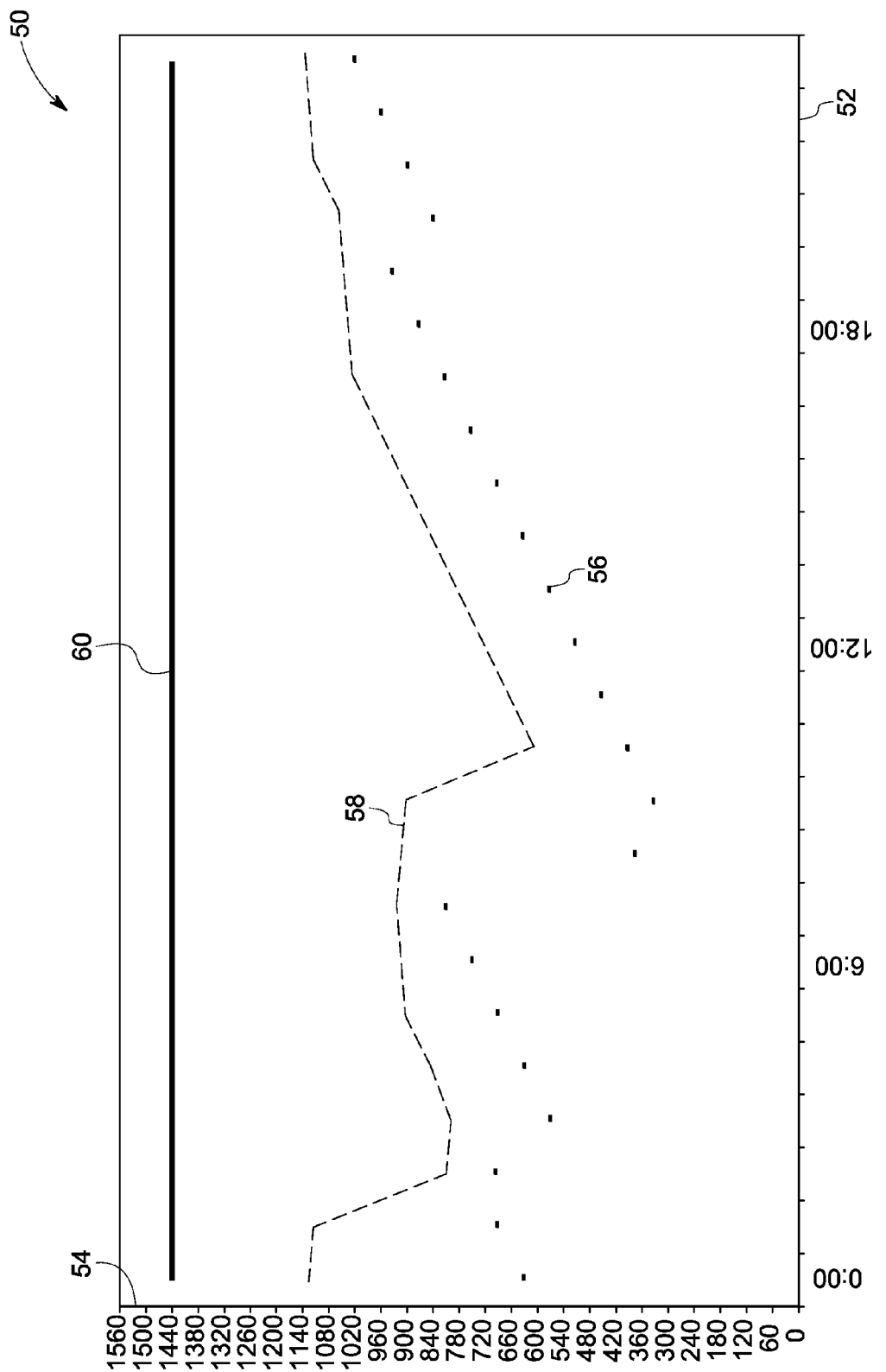
FIG. 3 depicts exemplary inactivity data clustered over weekdays using the access monitoring and control system of FIG. 1 in accordance with an embodiment of the invention.

FIG. 3 depicts exemplary inactivity data 50 clustered over weekdays using the access monitoring and control system 10 of FIG. 1 in accordance with an embodiment of the invention. The abscissa axis represents a time 52 of the day and the ordinate axis represents number of quiet minutes with no activity at the access portal 12 (FIG. 1). In the illustrated embodiment, profile 56 represents the maximum quiet minutes at the given time of the day obtained from the data points from the sensing device 14 (FIG. 1). Further, threshold for alerting is represented by exemplary profile 58. In this exemplary embodiment, once new data points exceed the threshold 58, a notification is issued to provide an indication of an abnormal inactivity at the access portal 12. In certain embodiments, the alarm 36 (FIG. 1) may be triggered to indicate such abnormal inactivity. Further, profile 60 represents an exemplary threshold for a full day. In certain embodiments, the threshold 60 may be utilized as a back-up notification method. This, as the new data points exceed the threshold 60, an alert or notification may be issued to security personnel 38 (FIG. 1) to indicate that the sensors 16 (FIG. 1) need inspection or testing.

Figure 4:
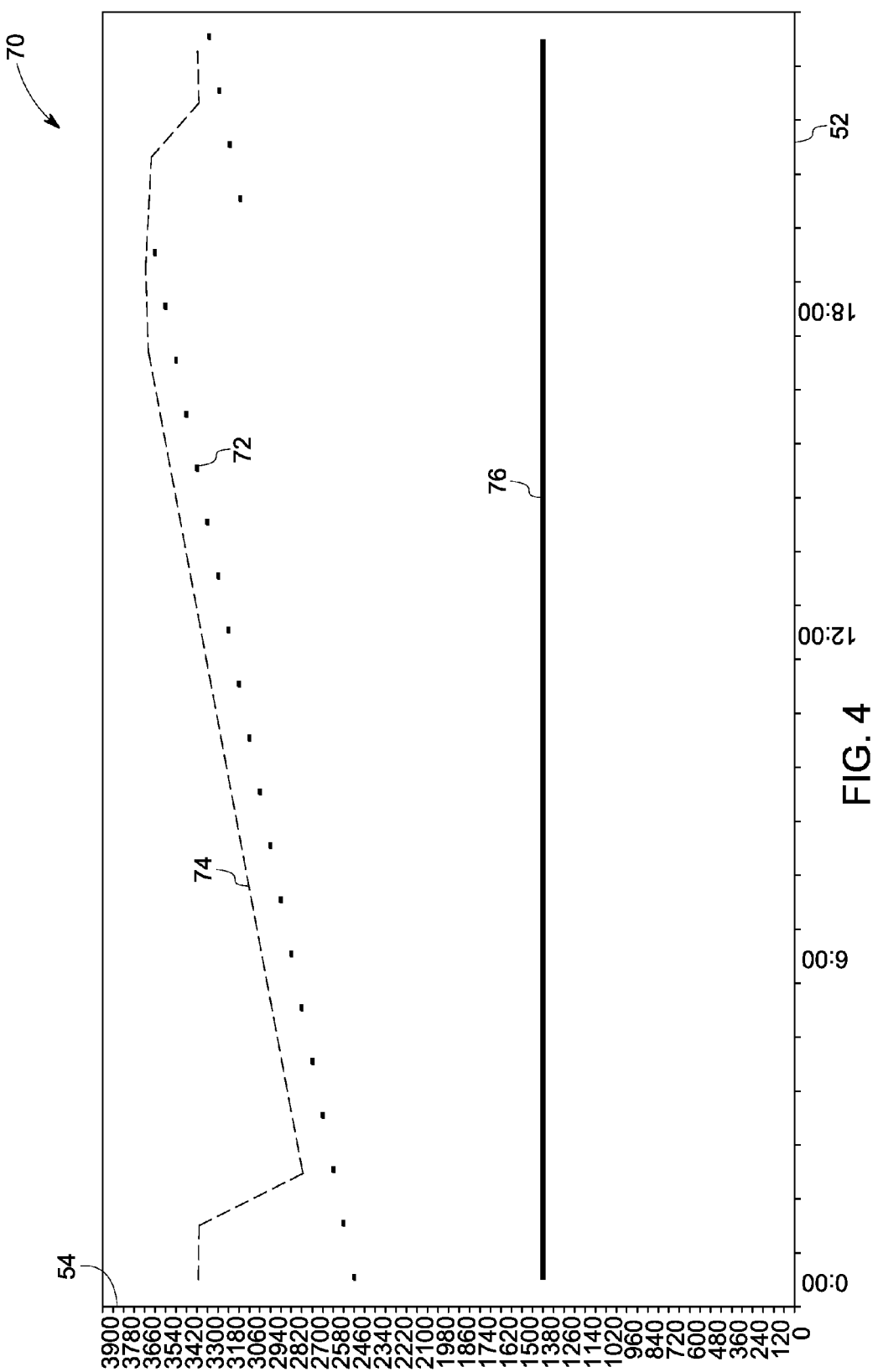
FIG. 4 depicts exemplary inactivity data clustered over weekends using the access monitoring and control system of FIG. 1 in accordance with an embodiment of the invention.

FIG. 4 depicts exemplary inactivity data 70 clustered over weekends using the access monitoring and control system 10 of FIG. 1 in accordance with an embodiment of the invention. Again, the abscissa axis represents the time 52 of the day and the ordinate axis represents the number of quiet minutes with no activity at the access portal 12 (FIG. 1). In the illustrated embodiment, profile 72 represents the maximum quiet minutes at the given time of the day obtained from the data points from the sensing device 14 (FIG. 1). As illustrated, the number of quiet minutes for weekends is relatively higher than the number of quiet minutes for weekdays. Further, threshold for alerting is represented by exemplary profile 74. In this exemplary embodiment, once new data points exceed the threshold 74, a notification is issued to provide an indication of an abnormal activity at the access portal 12. In certain embodiments, the alarm 36 (FIG. 1) may be triggered to indicate such abnormal activity. Further, profile 76 represents an exemplary threshold for a full day. In certain embodiments, the threshold 76 may be utilized as a back-up notification method. Thus, as the new data points exceed the threshold 76, an alert or notification may be issued to security personnel 38 (FIG. 1) to indicate that the sensors 16 (FIG. 1) need inspection or testing. Thus, new data points corresponding to weekdays or weekends may be evaluated against the respective activity clusters to detect an abnormal behavior as described above.

The various aspects of the methods and systems described hereinabove have utility in a variety of security systems for variety of public and private sites. The methods and systems described above enable detection of abnormal activities at access portals for such sites. In particular, the methods and systems discussed herein utilize an efficient, and reliable technique for forming activity clusters from obtained data from access control systems from such sites. Further, the embodiments described above also provide techniques that enable real-time detection of abnormal activity based upon such formed activity clusters.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed as new and desired to be protected by Letters Patent of the United States is:

1. An access monitoring and control system, comprising:
a sensing device configured to collect data points regarding at least one of movement of a person through an access portal and a state of the access portal; and
a processing unit configured to receive the data points from the sensing device, to organize the data points in time slots, and to form activity clusters from the data points based upon similar patterns of inactive or active behaviors during days of a week, wherein each day represents an instance in a data set and each time slot represents an attribute of the instance, wherein each of the data points of the activity clusters represent a cumulative inactive time, and wherein the processing unit is configured to group the days that have the most similar patterns to form the activity clusters.

2. The access monitoring and control system of claim 1, wherein the processing unit is configured to evaluate new data points against the formed activity clusters to detect an abnormal behavior for the new data points.

3. The access monitoring and control system of claim 2, wherein the processing unit is configured to transmit a signal indicative of the abnormal behavior for the new data points to a remote control unit.

4. The access monitoring and control system of claim 3, wherein the processing unit is configured to trigger an alarm indicative of the abnormal behavior for the new data points.

5. The access monitoring and control system of claim 4, wherein the abnormal behavior is representative of an improper functioning of the sensing device.

6. The access monitoring and control system of claim 1, wherein the access portal comprises a door, or a window, or combinations thereof.

7. The access monitoring and control system of claim 1, wherein the state of the access portal comprises an open or a closed state of the access portal.

8. The access monitoring and control system of claim 1, wherein the sensing device comprises a motion sensor, or a door sensor, or a window sensor, or a key pad entry, or a card reader, or a biometric reader, or combinations thereof.

9. The access monitoring and control system of claim 1, wherein the activity clusters include a weekday activity cluster formed using data points corresponding to similar patterns of inactive or active behaviors during weekdays and a weekend activity cluster formed using data points corresponding to similar patterns of inactive or active behaviors during weekends.

10. A method of providing an access monitoring and control system, comprising:
providing a sensing device for collecting data points regarding at least one of movement of a person through an access portal and a state of the access portal; and
providing a processing unit to receive the data points from the sensing device, to organize the data points in time slots, and to form activity clusters from the data points based upon similar patterns of inactive or active behaviors during days of a week, wherein each day represents an instance in a data set and each time slot represents an attribute of the instance, wherein each of the data points of the activity clusters represent a cumulative inactive time, and wherein the processing unit is configured to group the days that have the most similar patterns to form the activity clusters.

11. The method of claim 10, wherein said providing a processing unit comprises providing a processor to evaluate new data points against the formed clusters to detect an abnormal behavior for the new data points.

12. The method of claim 10, comprising providing a remote control unit for receiving signals indicative of the abnormal behavior of the new data points and for triggering an alarm indicative of the abnormal behaviors.

13. The method of claim 12, comprising providing the remote control unit for detecting an improper functioning of the sensing device based upon the signals indicative of the abnormal behavior for the new data points.

14. The method of claim 10, wherein said providing a sensing device comprises installing the sensing device on a door, or a window, or combinations thereof.

15. The method of claim 10, wherein said providing the sensing device comprises providing a motion sensor, or a door sensor, or a window sensor, or a keypad entry, or a card reader, or a biometric reader, or combinations thereof.

16. A method of detecting an abnormal activity for an access control system, comprising:
obtaining activity data from the access control system;
grouping the obtained activity data into activity clusters, each activity cluster representing those days of a week having similar patterns of inactive or active behaviors; and
evaluating new data points against the activity clusters to detect the abnormal activity.

17. The method of claim 16, wherein said obtaining activity data comprises collecting data points regarding at least one of movement of person through an access portal and a state of the access portal.

18. The method of claim 16, comprising generating a maximum inactivity line and an alert line based upon the obtained activity data.

19. The method of claim 18, wherein said evaluating new data points comprises determining whether the new data points exceed the maximum inactivity line and the alert line.

* * * * *